United States Patent [19]

Ando

[11] 4,267,508
[45] May 12, 1981

[54] APPARATUS FOR NON-CONTACT MEASUREMENT OF DISTANCE FROM A METALLIC BODY USING A DETECTION COIL IN THE FEEDBACK CIRCUIT OF AN AMPLIFIER

[75] Inventor: Seigo Ando, Yokohama, Japan

[73] Assignee: Nippon Kokan Kabushiki Kaisha, Tokyo, Japan

[21] Appl. No.: 27,830

[22] Filed: Apr. 6, 1979

[30] Foreign Application Priority Data

Apr. 11, 1978 [JP] Japan .................. 53-41728

[51] Int. Cl.³ .............. G01R 33/00; G01N 27/72; G01B 7/14; H01F 15/16
[52] U.S. Cl. ............................ 324/225; 324/207; 324/236; 336/179
[58] Field of Search ............ 324/224, 225, 105, 132, 324/207, 208, 236-237; 334/5; 335/217; 336/55, 179

[56] References Cited

U.S. PATENT DOCUMENTS

| | | | |
|---|---|---|---|
| 2,707,001 | 4/1955 | Hathaway | 336/179 X |
| 3,195,086 | 7/1965 | Taylor | 336/179 X |
| 3,209,292 | 9/1965 | Montross | 336/179 X |
| 3,843,945 | 10/1974 | Koning | 335/217 |
| 4,030,027 | 6/1977 | Yamaoa et al. | |

*Primary Examiner*—Gerard R. Strecker
*Attorney, Agent, or Firm*—Fleit & Jacobson

[57] ABSTRACT

An apparatus for non-contact measurement of the distance or gap between a detection coil and a metallic body arranged in an opposing relation with the detection coil, includes a differential amplifier having one input terminal connected to a reference oscillator and the other input terminal connected to a feedback circuit. The detection coil comprises a cylindrical coil and a plurality of magnetic members in rod form are arranged inside its inner bore along the direction of the coil axis and adjacent to the coil inner wall. The plurality of magnetic members comprise a combination of those having positive temperature characteristic and others having negative temperature characteristic so that a change with temperature of the permeability of the magnetic members as a whole is practically reduced to zero. The feedback circuit incorporates the amplified differential output signal of the differential amplifier and the detection coil so that the feedback input signal to the other input terminal of the differential amplifier is controlled by the impedance value of the detection coil which varies with a change in the distance. Consequently, the differential amplifier generates a differential output signal which is indicative of a measured distance.

4 Claims, 6 Drawing Figures

APPARATUS FOR NON-CONTACT MEASUREMENT OF DISTANCE FROM A METALLIC BODY USING A DETECTION COIL IN THE FEEDBACK CIRCUIT OF AN AMPLIFIER

BACKGROUND OF THE INVENTION

The present invention relates to apparatus for measuring the distance from a metallic body to be measured by utilizing the effect of the eddy currents induced in the metallic body, and more particularly the invention relates to improvements in such apparatus which ensure an increased measuring span.

An apparatus has been disclosed in U.S. Pat. No. 4,030,027 in which a reference signal having a fixed frequency and fixed amplitude is applied to the inverting input terminal of a differential amplifier whose output is applied to its noninverting input terminal through a positive feedback circuit and the feedback signal is also applied to a detection coil, whereby the distance from a metallic body disposed opposite to the coil is measured in accordance with a change in the coil impedance. Where the detection coil of this apparatus consists of a cylindrical coil, while the measuring span increases with an increase in the inner diameter of the coil, it is impossible to increase the coil inner diameter if there are limitations on the size or dimension of objects to be measured, the space available for the measuring means and the like. On the other hand, where a plurality of interchangeable coils are used with the measuring apparatus, it is advantageous from the design standpoint of the coil mounting structure to make the size of all the coils equal to one another as far as possible.

SUMMARY OF THE INVENTION

It is an object of the present invention to provide a distance measuring apparatus which ensures an increased measuring span without increasing the size of a detection coil.

It is another object of the invention to provide such distance measuring apparatus having an increased measuring span wherein the accuracy of measurement is not changed by any temperature change.

In accordance with the present invention there is thus provided a distance measuring apparatus in which a measuring circuit is identical in basic construction with that of the apparatus proposed in the previously mentioned prior application U.S. Pat. No. 4,030,027, but a detection coil is in the form of a cylindrical coil including a plurality of magnetic members in rod form having a high permeability and arranged within the inner bore of the detection coil so as to be adjacent to the coil inner wall and extend along the axial direction of the coil, and the plurality of magnetic members in rod form comprise a combination of those having positive temperature characteristic and others having negative temperature characteristic so that a change with temperature of the permeability of the magnetic members as a whole is practically reduced to zero.

With the plurality of rod magnetic members disposed inside the detection coil, a magnetic flux produced by the detection coil in response to a reference signal is passed through the magnetic members concentrically with a high permeability with the result that as compared with the cases employing no rod magnetic members the range of reach of the magnetic flux is increased and hence the measuring span is increased.

Usually ferite core is used as the material for the rod magnetic member in consideration of the reference signal frequency of the measuring apparatus and the temperature of metallic bodies to be measured, and it is of course possible to use any other high permeability magnetic material for the rod magnetic members.

The plurality of rod magnetic members comprise a combination of those whose initial permeability versus temperature characteristic is positive and others whose same characteristic is negative, with the result that the permeability on the whole is not affected by temperature changes and consequently the accuracy of measurement is not deteriorated by any change in the temperature of the rod magnetic members.

The rod magnetic members should preferably be disposed inside the detection coil so as to be arranged at equal spaces in the circumferential direction of the coil, and in this way it is possible to ensure a uniform distribution of the flux density in the circumferential direction of the detection coil.

The above and other objects, construction and effects of the invention may appear more apparent by reading the following description in conjunction with the accompanying drawings.

DESCRIPTION OF THE PREFERRED EMBODIMENTS

Figure 1:
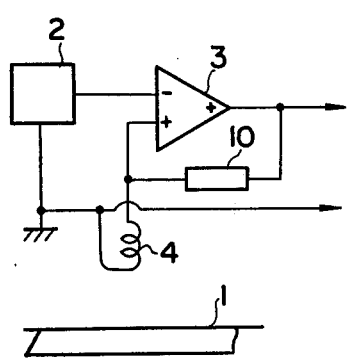
FIG. 1 is a circuit diagram showing the basic circuit construction of a distance measuring apparatus according to the invention.

FIG. 1 illustrates a basic circuit diagram of a distance measuring apparatus according to the invention, and the circuit construction is the same as proposed in U.S. Pat. No. 4,030,027. The operating principles of the circuit will now be described. In the Figure, numeral 1 designates a metallic body to be measured, 2 a reference oscillator for generating an AC reference signal having a fixed frequency and fixed amplitude, 3 a differential amplifier, 4 a detection coil having an impedance $Z_o$, and 10 a feedback element having an impedance $Z_s$. The reference oscillator 2 is connected to the inverting input terminal of the differential amplifier 3, and the feedback element 10 which feeds back the differential amplifier output, is connected, along with one end of the detection coil 4, to the noninverting input terminal of the differential amplifier 3 to form a positive feedback circuit. The other end of the detection coil 4 is grounded.

The amplification degree A of the amplifier 3 having the positive feedback circuit formed by the impedance $Z_s$ of the feedback element 10 and the impedance $Z_o$ of the detection coil 4, is given by the following equation by means of the amplification degree G of the amplifier 3 without feedback and the feedback ratio $$\beta = Z_o/(Z_s + Z_o)$$

$$A = G/(1 - G\beta)$$

When the reference oscillator 2 generates an output voltage of a fixed frequency and amplitude and applies it to the amplifier 3, the amplifier 3 amplifies the applied voltage and then applies it to the detection coil 4 through the feedback element 10.

When this occurs, the detection coil 4 generates an AC magnetic field so that the resulting magnetic flux passes through or links the metallic body 1 to be measured and its reaction causes a change in the impedance $Z_o$ of the detection coil 4.

This change in the impedance $Z_o$ is in correspondence with the distance between the detection coil 4 and the metallic body 1 and consequently the output voltage of the amplifier 3 changes correspondingly. As a result, by measuring this amplifier output voltage, it is possible to measure in a non-contact manner the distance between the detection coil 4 and the metallic body 1.

Figure 2:
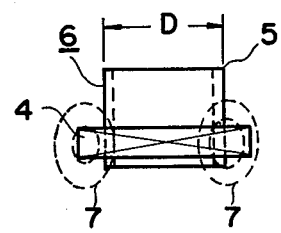
FIG. 2 is a longitudinal sectional view of a detection coil consisting of a cylindrical coil.

FIG. 2 shows detecting means 6 comprising a cylindrical coil 4 as the detection coil 4 of FIG. 1 and a cylindrical bobbin 5 using as a material a bakelite tube, magnetic tube, ceramic tube or the like on which the coil is wound. Numeral 7 designates the AC magnetic field produced by the coil 4 in response to a reference signal.

Figure 4:
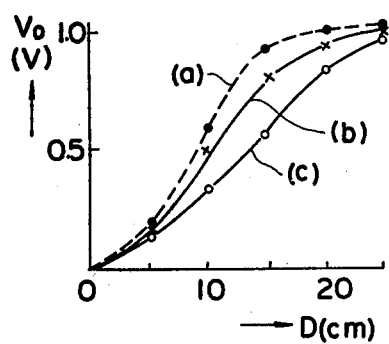
FIG. 4 is a graph showing an exemplary measuring characteristic, in which the abscissa represents the distance D (cm) and the ordinate represents the measured output voltage $V_o$ (V).

In FIG. 4, the curve (a) shows the results of the distance measurement of the metallic body 1 made by using the detecting means 6 in accordance with the basic circuit shown in FIG. 1.

Generally, where the detection coil 4 is shaped into a cylindrical form, while the measuring span can be increased with an increase in the coil inner diameter D, there are cases where the coil inner diameter D cannot be increased as desired depending on the measuring conditions.

Figure 3:
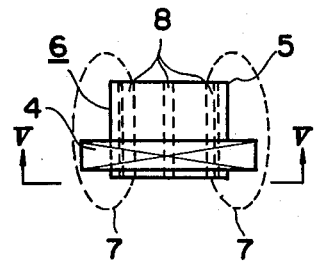
FIG. 3 is a longitudinal sectional view of the detection coil used in an embodiment of the invention.

FIG. 3 shows detecting means 6 used with an embodiment of the invention. In the Figure, numeral 8 designates magnetic members which are in rod form and having a high permeability such as ferrite cores, and a plurality (4 in the illustration) of the magnetic members are arranged adjacent to the inner wall of a cylindrical bobbin 5 along the coil axis. When the detection coil 4 shown in FIG. 3 is connected to the feedback circuit of the amplifier 3 shown in FIG. 1 and is operated as distance measuring means, the detection coil 4 produces an alternating field 7. By virtue of the rod magnetic member 8, the alternating field 7 can extend to a greater distance than in the case of the air-core type shown in FIG. 2. As a result, even if the distance between the detection coil 4 and the metallic body 1 is increased, effective eddy currents can be produced in the metallic body 1 and hence the measuring span can be increased than in the case of the known air-core type. In FIG. 4 the curves (b) and (c) respectively show the characteristics in the cases where the number of the rod magnetic members 8 used was 1 and 4, respectively. As will be seen from the Figure, the provision of the rod magnetic members 8 has the effect of increasing the linearity region of the measuring characteristics and thereby increasing the measuring span to about 1.5 to 2 times that of the conventional characteristic or the curve (a).

However, while the measuring span can be increased through the provision of the rod magnetic members 8 such as ferrite cores, the resulting measured value is affected by the temperature characteristic of the rod magnetic members thus tending to deteriorate the accuracy of measurement. In particular, a serious measurement error will be caused in such measuring environment where the temperature of the magnetic members change considerably.

To date the manufactures of magnetic materials have been conducting various researches in the field of magnetic materials whose permeability changes less with temperature changes, and it is in fact difficult to completely eliminate the possibility of changes in the permeability due to temperature changes by merely improving the properties of such magnetic members.

Figure 5:
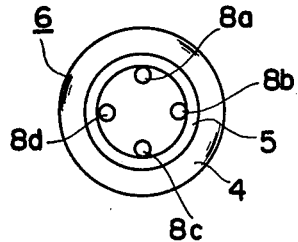
FIG. 5 is a bottom view of FIG. 3 looked in the direction of the arrow lines V—V.

Thus, in consideration of the temperature characteristics of such magnetic members, in accordance with the present invention, as shown in FIG. 5, rod magnetic members 8a to 8d having temperature characteristics of different polarities, that is, a combination of those having a positive temperature characteristic and others having a negative temperature characteristic, are arranged on the inner wall of the cylindrical bobbin 5 so as to be positioned at equal spaces in the circumferential direction of the coil.

For instance, among the rod magnetic members 8a to 8d, a ferrite core having a positive temperature characteristic may be used for each of the members 8a and 8c and a ferrite core having a negative temperature characteristic for each of the members 8b and 8d which are located between the former members, thus cancelling on the whole any changes in the permeability due to temperature changes.

In this case, the rod magnetic members 8a to 8d should preferably be selected to have the temperature coefficients of the equal absolute value and the number of those having the positive temperature characteristic should preferably be made equal to the others having the negative temperature characteristic.

In this way, even the temperature of the detection coil 4 changes, the accuracy of measurement will not be deteriorated thus ensuring stable measurement of the distance.

While, in the embodiment described above, two pairs of the magnetic members respectively having the positive and negative temperature characteristics are used, the invention is not intended to be limited to this embodiment.

Figure 6:
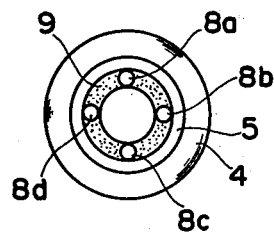
FIG. 6 is a bottom view of the detection coil used in still another embodiment of the invention which is looked in the similar manner as FIG. 5.

On the other hand, the magnetic members 8a to 8d may be mounted in place by using a nonmagnetic material 9 (metal or insulating material) which is attached or molded, along with the magnetic members, to the inner wall of the cylindrical bobbin as shown in FIG. 6.

The rod magnetic members 8a to 8d are not limited to any cross-sectional shape and they may be in the form of round rods, square rods or the like.

It will thus be seen from the foregoing description that the present invention has a great utility despite its simple construction.

What is claimed is:

1. In an apparatus comprising a feedback amplifier including a feedback circuit connected to a detection coil disposed opposite to a metallic body to be measured, and a reference oscillator for applying to said feedback amplifier a reference signal having a predetermined frequency and predetermined amplitude, wherein, in response to a change in the impedance of said detection coil which impedance changes according to the distance between said detection coil and said metallic body, the amplification degree of said feedback amplifier is controlled to measure the distance between said detection coil and said metallic body disposed opposite thereto in accordance with the amplitude of an output signal of said amplifier, the improvement wherein said detection coil comprises a cylindrical coil having an inner bore of given radius, wherein a plurality of magnetic members each having a high permeability and being in rod form are disposed inside an inner bore of said detection coil so as to be arranged adjacent to the inner wall thereof along the direction of an axis of said detection coil, and wherein said plurality of magnetic members in rod form comprise a combination of some of said magnetic members having a positive temperature characteristic and the remainder of said magnetic members having a negative temperature characteristic, said plurality of magnetic rod members having a diameter smaller than the given radius of the inner bore of the cylindrical coil, whereby a change with temperature of the permeability of said magnetic members as a whole is practically reduced to zero.

2. A distance measuring apparatus according to claim 1, wherein said rod-shaped magnetic members having a positive temperature characteristic are arranged at equal spaces in a circumferential direction of said coil, and wherein said rod-shaped magnetic members having a negative temperature characteristic are arranged between said rod-shaped magnetic members having a positive temperature characteristic at equal space in said circumferential direction.

3. A distance measuring apparatus according to claim 1, wherein each of said rod-shaped magnetic members having a positive temperature characteristic forms a pair with an associated one of said rod-shaped magnetic members having a negative temperature characteristic.

4. A distance measuring apparatus according to claim 1, wherein said detection coil is wound on a cylindrical bobbin, and wherein said rod-shaped magnetic members are attached to an inner wall of said bobbin with a non-magnetic material.

* * * * *